United States Patent
Arikawa et al.

(10) Patent No.: US 8,460,799 B2
(45) Date of Patent: Jun. 11, 2013

(54) HIGH-TEMPERATURE RESISTANT COMPONENT AND GAS TURBINE HOT PART

(75) Inventors: Hideyuki Arikawa, Mito (JP); Akira Mebata, Kitaibaraki (JP); Yoshitaka Kojima, Hitachi (JP); Kunihiro Ichikawa, Hitachinaka (JP); Hiroshi Haruyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 12/822,208

(22) Filed: Jun. 24, 2010

(65) Prior Publication Data
US 2010/0330391 A1 Dec. 30, 2010

(30) Foreign Application Priority Data
Jun. 30, 2009 (JP) ................. 2009-154526

(51) Int. Cl.
*B32B 15/00* (2006.01)
*B32B 15/04* (2006.01)

(52) U.S. Cl.
USPC ................. 428/630; 416/241 R; 416/241 B; 416/632; 428/632

(58) Field of Classification Search
None
See application file for complete search history.

(56) References Cited

U.S. PATENT DOCUMENTS

| | | | |
|---|---|---|---|
| 5,384,200 A * | 1/1995 | Giles et al. ............. | 428/552 |
| 6,294,261 B1 | 9/2001 | Sangeeta et al. | |
| 6,465,090 B1 * | 10/2002 | Stowell et al. ............. | 428/325 |
| 6,706,325 B2 * | 3/2004 | Spitsberg et al. ......... | 427/255.19 |
| 2006/0151856 A1 * | 7/2006 | Torigoe et al. ............. | 257/632 |
| 2007/0128447 A1 | 6/2007 | Hazel et al. | |
| 2008/0107810 A1 * | 5/2008 | Kim et al. ............. | 427/251 |

FOREIGN PATENT DOCUMENTS

| | | |
|---|---|---|
| JP | 62-211387 | 9/1987 |
| JP | 04-143262 | 5/1992 |
| JP | 07-268594 | 10/1995 |
| JP | 07-292453 | 11/1995 |
| JP | 09-078258 | 3/1997 |
| JP | 9-78258 | 3/1997 |
| JP | 2001-226759 | 8/2001 |
| JP | 2004-360699 | 12/2004 |
| JP | 2007-187152 | 7/2007 |

OTHER PUBLICATIONS

Definition of principal, Webster's Ninth New Collegiate Dictionary, Merriam-Webster Inc., 1987, p. 935.*
Japanese Office Action of Appln. 2009-154526 dated Nov. 22, 2011 with partial English translation.
JP Office Action of Appln. No. 2009-154526 dated Jun. 12, 2012 with English translation.

* cited by examiner

*Primary Examiner* — Jennifer McNeil
*Assistant Examiner* — Adam Krupicka
(74) *Attorney, Agent, or Firm* — Antonelli, Terry, Stout & Kraus, LLP.

(57) ABSTRACT

A high-temperature resistant component for, e.g., a gas turbine hot part, includes an alloy substrate containing Ni, Co, or Fe as the principal component, and a thermal barrier coating formed over the surface of the substrate via a bond coat. The thermal barrier coating includes a porous thermal-barrier layer made of ceramic and an environmental barrier layer with corrosion resistance. An impregnated layer is provided between the environmental barrier layer and the thermal barrier layer. In the impregnated layer, the thermal barrier layer is impregnated with a part of the environmental barrier layer. The thermal barrier layer is made of a porous zirconia layer, and the environmental barrier layer includes silica as the principal component. The porous zirconia layer has pores impregnated with the part of the environmental barrier layer. As a result, the high-temperature resistant component has excellent corrosion resistance and excellent heat resistance.

22 Claims, 1 Drawing Sheet

HIGH-TEMPERATURE RESISTANT COMPONENT AND GAS TURBINE HOT PART

CLAIM OF PRIORITY

The present application claims priority from Japanese Patent Application JP 2009-154526 filed on Jun. 30, 2009, the content of which is hereby incorporated by reference into this application.

FIELD OF THE INVENTION

The present invention relates to a gas turbine hot part such as turbine buckets and nozzles, and a combustor, or relates to a hot part used under severe environmental corrosion conditions at high temperature. The invention also relates to a thermal barrier coating with excellent heat resistance and excellent corrosion resistance used for such a hot part.

BACKGROUND OF THE INVENTION

Gas turbines have an operating temperature increased year by year for the purpose of improving the efficiency. In order to deal with the increase in operating temperature, a thermal barrier coating (hereinafter referred to as a "TBC") made of ceramic is applied to the surface of a gas turbine hot part to relieve the environmental temperature of the part. In general, the application of the TBC can decrease the temperature of a substrate by 50 to 100° C. depending on the conditions of use.

Japanese Unexamined Patent Application Publication No. SHO62-211387 discloses a TBC including a thermal barrier layer made of partially-stabilized zirconia with low heat conductivity and excellent heat resistance. The TBC is formed over the substrate via a MCrAlY alloy layer, where M represents at least one element selected from the group consisting of iron(Fe), Ni, and Co, Cr represents chrome, Al represents aluminum, and Y represents yttrium.

The TBC for the gas turbine needs to improve the heat resistance so as to deal with the high-temperature combustion gas, and to reduce granular friction (erosion) of solid particles (mainly, oxides) contained in the combustion gas. Japanese Unexamined Patent Application Publication No. HEI9-78258 discloses that a dense protective layer is provided on the surface of a porous thermal-barrier layer with excellent heat resistance for the purpose of improving the resistance to erosion.

The gas turbine has conventionally used relatively high-grade oil as fuel, such as liquid natural gas (LNG), kerosene, or light oil, from the viewpoint of combustion characteristics and corrosion prevention. Such fuels contain very small amount of corrosion factor, such as sulfur(S) and ash content. The approximate amount of S is equal to or less than about 0.01% by mass and the amount of ash content is nearly equal to zero. Therefore, the hot part hardly undergoes corrosion and damage.

In recent years, however, from the viewpoint of increasing cost of fuel and saving resources, the gas turbines have increasingly used the low-grade oil, such as heavy oil. The low-grade oil contains elements as corrosion factors, such as sulfur, alkali metal, or vanadium. In combustion gas, the corrosion factor elements react with each other, with oxygen (O) in combustion air, or with sea salt particles (for example, NaCl) in a complicated manner to generate a compound which causes corrosion at high temperature. Such a compound causes damage to the TBC, especially a zirconia layer part of the TBC.

The object of the present invention is to provide a high-temperature resistant component for a gas turbine hot part and so on. The high-temperature resistant component has durability and reliability enough to withstand a corrosive environment with use of the low-grade oil.

SUMMARY OF THE INVENTION

In order to achieve the object, the invention employs a TBC including an environmental barrier layer with adequate corrosion resistance over the surface of a thermal barrier layer. Specifically, a high-temperature resistant component of the invention includes an alloy substrate containing Ni, Co, or Fe as the principal component, and a thermal barrier coating formed over the surface of the substrate via a bond coat. The thermal barrier coating includes a porous thermal-barrier layer made of ceramic and an environmental barrier layer with corrosion resistance. An impregnated layer is provided between the environmental barrier layer and the thermal barrier layer. In the impregnated layer, the thermal barrier layer is impregnated with a part of the environmental barrier layer. The thermal barrier layer is made of a porous zirconia layer, and the environmental barrier layer includes silica as the principal component. The porous zirconia layer has pores impregnated with the part of the environmental barrier layer.

The environmental barrier layer avoids contact between molten salt and the thermal barrier layer to prevent the molten salt corrosion of the thermal barrier layer. At the same time, since the porous stabilized zirconia layer has pores impregnated with a part of the environmental barrier layer, the environmental barrier layer can obtain the high adhesion to the thermal barrier layer and the porous thermal-barrier layer existing under the impregnated layer exhibits a thermal stress relief function.

In a specific example corresponding to the above configuration, a high-temperature resistant component includes a substrate including an alloy containing Ni, Co, or Fe as the principal component, an alloy layer formed on the substrate and made of a MCrAlY alloy or MCrAl alloy (where M is at least one of Fe, Ni, and Co), a porous ceramic layer formed on the alloy layer and made of a partially-stabilized zirconia, and a dense glass layer formed on the ceramic layer and containing silica as the principal component. The porous ceramic has pores at its upper part impregnated and filled with a part of the glass layer, so that the porous ceramic layer is integrated with the glass layer.

The environmental barrier layer has a barrier effect against the environment and improves the corrosion resistance. Impregnating the thermal barrier layer with a part of the environmental barrier layer improves the adhesion between these layers and prevents the damage to the thermal barrier layer. As a result, the durability and reliability of the high-temperature resistant component is improved.

DETAILED DESCRIPTION OF THE PREFERRED EMBODIMENTS

Figure 1:
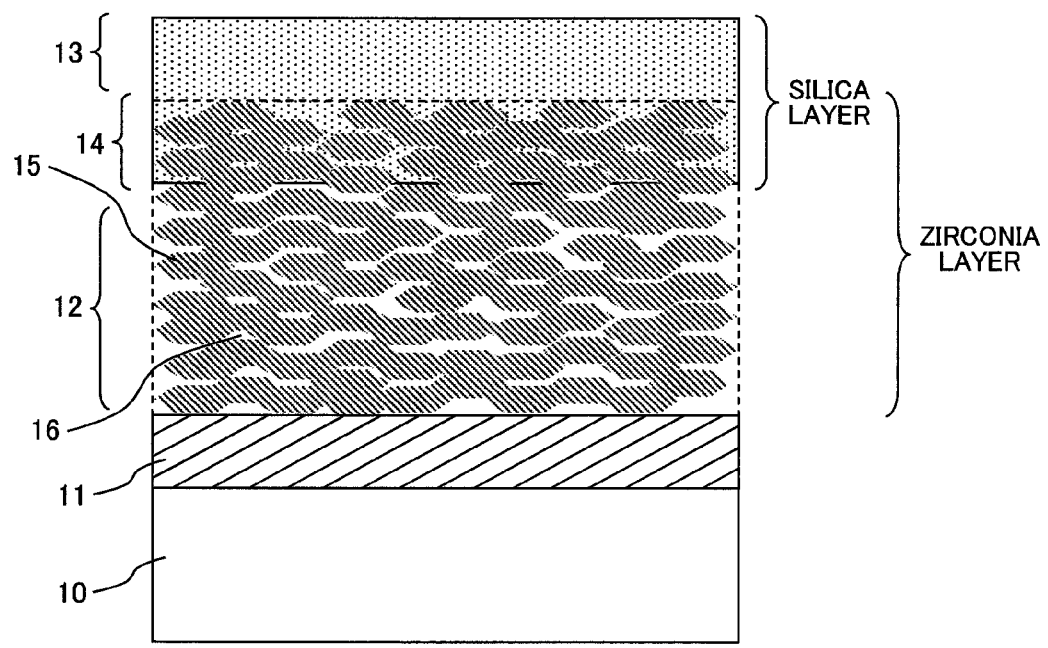
FIG. 1 is a schematic cross-sectional view of an example of a high-temperature resistant component of the present invention.

The temperature of a gas turbine hot part with a TBC can be reduced to a lower level than that without the TBC by the thermal barrier effect of the TBC. The gas turbine hot part of the invention can be applied to the part requiring high-temperature strength (for example, turbine buckets and nozzles, and a combustor) among the gas turbine part in many cases. The application of the TBC to the gas turbine hot part is very effective. First, the corrosion of the TBC will be described in detail below.

As low-grade oil, low-sulfur A heavy oil (LSA heavy oil) having relatively low sulfur and ash content is now used mainly in small and medium-sized gas turbines. Additionally, another low-grade oil, such as high-sulfur A heavy oil, B heavy oil, or C heavy oil, is also highly required as fuel. The low-grade oil contains corrosion factors, such as alkali meal (Na, K) and vanadium (V), in sulfur and ash content. For example, according to Japanese Industrial Standards (JIS) K2205 "heavy oil", the low-sulfur A heavy oil (grade No. 1-1 heavy oil) contains 0.5% or less of S and 0.05% or less of ash content. The high-sulfur A heavy oil (grade No. 1-2 heavy oil) contains 2.0% or less of S and 0.05% or less of ash content. The B heavy oil (grade No. 2 heavy oil) contains 3.0% or less of S and 0.05% or less of ash content. The C heavy oil (grade No. 3-1 heavy oil) contains 3.5% or less of S and 0.1% or less of ash content. Further, the S and ash content of some low-grade heavy oils are not defined. The high-grade oil, which is conventionally used, contains about 0.01% by mass or less of S and hardly contains ash content.

The corrosion factors contained in the low-grade oil react with each other, with oxygen (O) in the combustion air, or with sea salt particles (for example, NaCl) in the combustion gas in a complicated manner to generate various compounds which will cause corrosion at high temperature. In particular, the compound having a relatively low melting point adheres in a melting state to the surface of the hot part and then is condensed, causing severe corrosion of the hot part at high temperature (which is the so-called molten salt corrosion). A heat resistant alloy used in the gas turbine hot part also corrodes drastically due to the molten salt corrosion. This is a large problem in use of the low-grade oil. A protective oxide layer is formed on the surface of the heat resistant alloy. The protective oxide layer is made of chromia ($Cr_2O_3$) or alumina ($Al_2O_3$) which contributes to oxidation resistance and corrosion resistance. However, the protective oxide layer will be easily melted in the molten salt.

A partially-stabilized zirconia of the TBC is also damaged by the molten salt corrosion. Particularly, in an environment where the fuel contains more than 0.5% of S and more than 0.01% of V, the partially-stabilized zirconia used in a thermal barrier layer of the conventional TBC is damaged by the molten salt corrosion, and then tends to be peeled off for a short time. The damage to the TBC due to the molten salt corrosion should be suppressed in order to provide the TBC with the sufficient durability and reliability even in the operation for a long time under the molten salt corrosion environment using the low-grade oil.

The inventors has provided the TBC with the thermal barrier layer made of ceramic via a bond coat and coated the surface of the thermal barrier layer with the environmental barrier layer against high-temperature corrosion. An example of the bond coats includes an alloy layer made of a MCrAl layer. An example of the thermal barrier layers includes a porous ceramic layer, such as a stabilized zirconia layer. An example of the environmental barrier layers includes a layer containing silica as the principal component, such as a silica glass layer. The pores of the porous thermal-barrier layer are impregnated with a part of the environmental barrier layer, and another part of the environmental barrier layer still remains over the surface of the thermal barrier layer. Thus, the environmental barrier layer avoids contact between the molten salt and the thermal barrier layer to prevent the molten salt corrosion of the thermal barrier layer. At the same time, since the pores of the thermal barrier layer are impregnated with the part of the environmental barrier layer, both layers can obtain the high adhesion between each other. Further, the porous thermal-barrier layer exhibits a thermal stress relief function. The high-temperature resistant component employing such a TBC has excellent corrosion resistance and excellent heat resistance.

The TBC of the invention, compared to the conventional TBC, has excellent corrosion resistance and excellent heat resistance in the severe molten salt corrosion environment, and hence is suitable for use in the gas turbine hot part. Since the hot part of the invention improves durability and reliability in operating the gas turbine, the cycle of replacement and checking of the hot part can be set long, which leads to low operating cost of the gas turbine. The gas turbine can be operated using inexpensive low-grade oil, which can reduce the fuel cost of the gas turbine. Examples of the gas turbine hot parts to be operated in the severe corrosion environment under the high-temperature condition include turbine buckets and nozzles, and a combustor.

The gas turbine hot part of the invention includes a bond coat, a thermal barrier layer, an impregnated layer, and an environmental barrier layer over a substrate made of an alloy with adequate heat resistance. As the alloy substrate, various kinds of heat resistance alloys, used for the gas turbine buckets and nozzles, and combustors, can be employed. The alloy substrate is preferably made of an alloy containing Ni, Co, or Fe as the principal component.

The bond coat has a coefficient of thermal expansion that is intermediate value between those of the alloy substrate and the thermal barrier layer so as to enhance the adhesion between the alloy substrate and the barrier layer. The bond coat is preferably made using an alloy with excellent corrosion resistance and excellent oxidation resistance compared to the substrate. The material generally known for the bond coat of the TBC can be used for the bond coat of the TBC of the invention. For example, the bond coat is desirably made of the alloy which substantially contains Ni and Co as the principal component with Cr and Al added thereto. Further, the bond coat can include, as an additional element, 0-10% by weight (wt) of any one or a combination of Y, Hf, Ta, Si, and Ce. In particular, an alloy generally referred to as a "MCrAlY" (where M is at least one of Ni, Fe, and Co) is preferably used. The bond coat is most preferably formed by a low-pressure plasma spray process, but can be formed by a high velocity thermal spray process, such as a high velocity oxy-fuel spray (HVOF) or a high velocity air-fuel spray (HVAF). The thickness of the bond coat is preferably in a range of 0.05-0.3 mm.

The thermal barrier layer is made of porous ceramic, preferably formed using $ZrO_2$-based ceramic. Especially, it is desirable that the $ZrO_2$-based ceramic is formed using partially-stabilized zirconia containing at least one element selected from the group consisting of $Y_2O_3$, MgO, CaO, $CeO_2$, $Sc_2O_3$, $Er_2O_3$, $Gd_2O_3$, $Yb_2O_3$, $Al_2O_3$ $SiO_2$, and $La_2O_3$. Yttria ($Y_2O_3$) partially-stabilized zirconia is most preferable. The thermal barrier layer made of porous stabilized zirconia can be formed using the atmospheric plasma spray process. In using the thermal barrier layer as a member of the gas turbine hot part, the thickness of the thermal barrier layer is preferably in a range of 0.1-1 mm. If the thickness is below 0.1 mm, the TBC may not obtain the sufficient thermal barrier property. If the thickness is over 1 mm, the heat resistance is lower and the thermal barrier layer tends to be peeled off, which is not preferable. A porosity of the thermal barrier layer made of porous stabilized zirconia, which is an area ratio of pores to a sectional structure, is preferably in a range of 10-30%. If the porosity is below 10%, the thermal stress relief function provided by the pores does not work sufficiently, reducing the heat resistance. If the porosity is over 30%, the mechanical strength of the thermal barrier layer is reduced and the layer is easily peeled off.

The environmental barrier layer prevents damage due to corrosion caused by contact between the molten salt and the thermal barrier layer, the bond coat, and the heat resistant alloy substrate. Even when the environmental barrier layer is in contact with the molten salt, the environmental barrier layer protects and maintains the layers without reaction or dissolution, and prevents the molten salt from passing through the environmental barrier layer. Therefore, the porosity of the environmental barrier layer is preferably equal to or less than 5%. When the porosity exceeds 5% and the rate of open pores is increased, the molten salts tend to permeate and pass through the environmental barrier layer through the pores. The thickness of the environmental barrier layer is preferably in a range of 0.05-0.1 mm. If the thickness of the environmental barrier layer is below 0.05 m, the environmental barrier layer cannot obtain the sufficient shielding property. If the thickness is over 0.1 mm, cracks tend to be generated due to residual stress or thermal stress upon deposition, which is not preferable. If the cracks are generated, the shielding property is degraded through the cracks and the environmental barrier layer tends to be easily peeled off. The environmental barrier layer is formed using slurry whose viscosity is adjusted or using a sol-gel process.

As the material of the environmental barrier layer, silica ($SiO_2$), which is difficult to react with the molten salt, is preferable as the principal component. For example, when using fuel containing sulfur, a sulfate of alkali metal (for example, $Na_2SO_4$, $K_2SO_4$) is mostly attached or condensed on the surface of the hot part, depending on other simultaneously existing compounds or atmospheric environment. Such a sulfate has properties of an acid salt and reacts with an amphoteric oxide, such as alumina or chromia, and with a basic oxide, such as zirconia or yttria, dissolving, and easily causing the molten salt corrosion. High-purity silica is difficult to react with the molten salt because it is an acid oxide, and thus exhibits excellent durability to withstand the molten salt corrosion. Although an additive other than silica may be added to the environmental barrier layer made of silica, other components which are not resistant to sulfur and vanadium, such as zirconia or alumina, should not be added to. In some cases, the environmental barrier layer with low-purity silica may reduce corrosion resistance to the molten salt due to the influences of impurities. Thus, a silica glass with 90% or more of silica purity is especially desirable.

A sol-gel process using an alcohol solution containing metal alkoxide can be applied as a method for forming the environmental barrier layer containing silica as the principal component. Other solutions containing a silica precursor may be used, such as a colloidal silica solution or an alkali metal silicate solution. The solution is applied to form a precursor layer, which is then dried and burned to form a silica layer. Alternatively, a commercially available silica coating agent can be used. The finally formed silica layer needs to have the adequate corrosion resistance to the molten salt as long as the influences of additives and impurities are allowable.

The impregnated layer improves the adhesion between the environmental barrier layer and the porous thermal-barrier layer, and prevents peeling of the environmental barrier layer. The impregnated layer contains porous ceramic originating from the thermal barrier layer and a silica compound originating from the environmental barrier layer. The ratio of the thickness of the impregnated layer to that of the thermal barrier layer is about 10-20%. If the impregnated layer is excessively thin, the adhesion between the environmental barrier layer and the thermal barrier layer becomes insufficient. If the impregnated layer is excessively thick, the porosity of the thermal barrier layer substantially decreases, resulting in reduction in heat barrier property and stress relief effect. Additionally, the environmental barrier layer becomes easy to peel off due to decrease in the thermal stress relief function by the pores. Therefore, the thickness of the impregnated layer is preferably in a range of about 0.01-0.1 mm.

In a case where the environmental barrier layer is provided using a solution containing a silica precursor, the solution is previously prepared by adjusting its viscosity appropriately. When the solution is applied to the surface of the porous thermal-barrier layer, a part of the solution permeates the pores of the thermal barrier layer by the capillary action. The permeated solution is dried and burned, solidified in pores of the thermal barrier layer made of porous stabilized zirconia, forming the impregnated layer containing silica. The thickness (depth) of the impregnated layer can be adjusted by changing the viscosity of the solution or the size of each pore of the thermal barrier layer.

With reference to FIG. 1, one example of the high-temperature resistant component of the present invention will be described. FIG. 1 is a schematic cross-sectional view of an example of the high-temperature resistant component. A porous thermal-barrier layer 12 made of sprayed stabilized-zirconia particles 15 is formed over the surface of an alloy substrate 10 containing Ni, Co, or Fe as the principal component via a bond coat 11 made of a MCrAlY alloy. An environmental barrier layer 13 made of silica as the principal component is provided over the surface of the thermal barrier layer 12 to withstand corrosion at high temperature. An impregnated layer 14 is formed by impregnating the pores 16 among the sprayed stabilized-zirconia particles 15 of the thermal barrier layer 12 with a part of the environmental barrier layer 13.

The high-temperature resistant component of the invention has excellent durability in corrosion environments. Therefore, the high-temperature resistant component is applicable as a hot part to be used on a high-temperature condition, such as turbine buckets and nozzles, or a combustor of the gas turbine. The high-temperature resistant component of the invention can be applied not only to the gas turbine, but also to other high-temperature devices, such as an airplane engine.

First Embodiment

Figure 2:
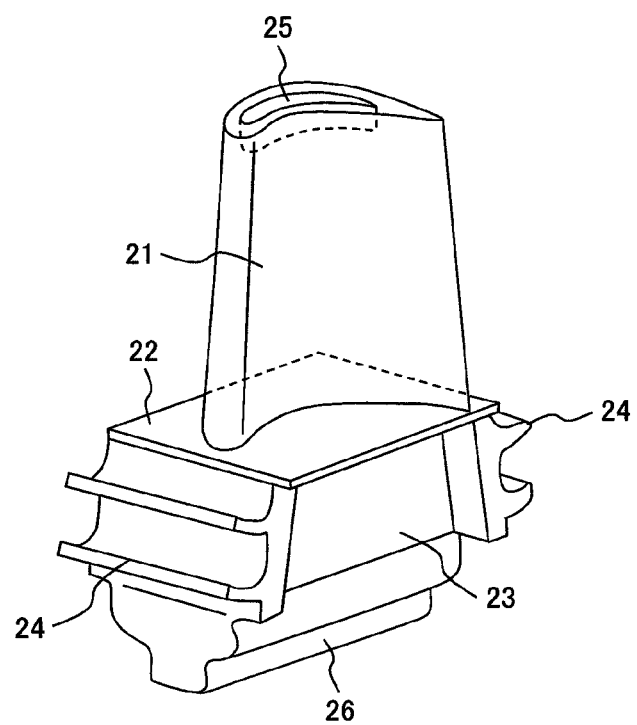
FIG. 2 is a perspective view showing the shape of a gas turbine bucket in accordance with an embodiment of the present invention.

With reference to FIG. 2, a gas turbine bucket in accordance with an embodiment of the present invention will be described. FIG. 2 is a perspective view of the entire structure of a gas turbine bucket. The gas turbine bucket is made of a Ni-group heat resistant alloy (Rene 80), and used as a first stage bucket of a gas turbine rotor with three-stage buckets. The gas turbine bucket includes an air foil 21, a platform 22, a shank 23, a seal fin 24, and a tip pocket 25, and is attached to a disk via a dovetail 26. The length of the air foil 21 is 100 mm; the length of the platform 22 and the following part is 120 mm. A cooling hole (not shown) is formed from the dovetail 26 through the air foil 21 in order to flow a cooling medium, especially, air or steam for cooling the bucket from the inside. The TBC is formed on the air foil 21, which is exposed to combustion gas, and the platform 22. The manufacturing method of the gas turbine bucket will be described below.

On a substrate for a test bucket, a bond coat was formed by low-pressure plasma spray process using CoNiCrAlY alloy powder (Co-32 wt % Ni-21 wt % Cr-8 wt % Al-0.5% Y). As a diffusion heat treatment, heat treatment was carried out in a vacuum on the conditions of 1121° C.×2 hours+843° C.×24 hours. The thickness of the bond coat was about 200 μm.

Then, a zirconia layer made of porous ceramic was formed with a porosity of about 20% and a thickness of about 0.5 mm over the substrate with the bond coat thereon by the atmospheric plasma spray process using yttria partially-stabilized zirconia powder ($ZrO_2$-8 wt % $Y_2O_3$). Then, a solution containing a silica precursor was prepared by adding water to a ceramic adhesive and filler, for example, the commercially available "Aron Ceramic C (trade name)" manufactured by TOAGOSEI CO., LTD so as to have the viscosity of about 3 Pa*sec at room temperature. The solution was applied to the surface of the zirconia layer by the dip method. After the application of the solution, the test bucket was naturally dried at room temperature for 24 hours. Then, the test bucket was heated in an electric furnace on the conditions of about 90° C.×1 hour and 150° C.×1 hour. As a result, the environmental barrier layer containing silica as the principal component was formed on the surface of the porous zirconia layer. When the cross section of a small-sized test piece was observed, which is previously manufactured in the same way, the thickness of the environmental barrier layer was about 0.1 mm and the thickness of the impregnated layer was about 0.05 mm.

A test was performed to examine the durability of the gas turbine bucket of this embodiment, using an actual gas turbine which had been operated with special A heavy oil as fuel and damaged by molten salt corrosion. For comparison, a turbine bucket with only the bond coat and the thermal barrier layer and without the environmental barrier layer (that is, a turbine bucket with conventional TBC) was also manufactured in the same way as the above turbine bucket of this embodiment was. The test bucket according to this embodiment and the conventional bucket were simultaneously subjected to the test. The buckets were observed after a two-year operation. As a result, the gas turbine bucket according to this embodiment did not have any damage to the TBC and was still in a good condition. In contrast, the conventional bucket for comparison had the thermal barrier layer locally peeled. When a part of the thermal barrier layer was mechanically taken out from the peeled portion and the cross section of the thermal barrier layer was analyzed, the elements S and V were detected. Therefore, the peeling was caused by the molten salt corrosion. As can be seen from the above results, the gas turbine bucket of this embodiment has excellent durability as compared to the conventional gas turbine bucket. Even when the gas turbine is operated for a long time under the molten salt corrosion environment using low-grade oil, the gas turbine bucket of this embodiment has the adequate durability and reliability.

The bucket of this embodiment is suitable for the first stage at high temperature. Obviously, the bucket of this embodiment can be used for the second or subsequent stage bucket.

What is claimed is:

1. A high-temperature resistant component comprising:
a substrate containing an alloy including Ni, Co, or Fe as a principal component;
a bond coat being formed on the substrate and including an alloy; and
a thermal barrier coating being formed on the bond coat, wherein the thermal barrier coating comprises a thermal barrier layer formed on the bond coat and containing porous ceramic, an impregnated layer formed on the thermal barrier layer, and an environmental barrier layer formed on the impregnated layer and consisting of silica glass, the impregnated layer being a layer in which pores of the porous ceramic of the thermal barrier layer are impregnated with a part of the silica of the environmental barrier layer, and the environmental barrier layer having a thickness of 0.05-0.1 mm.

2. The high-temperature resistant component according to claim 1, wherein the thermal barrier layer contains zirconia.

3. The high-temperature resistant component according to claim 1, wherein the environmental barrier layer has a porosity of 5% or less.

4. The high-temperature resistant component according to claim 1, wherein the thermal barrier layer has a thickness of 0.1-1 mm.

5. The high-temperature resistant component according to claim 1, wherein the thermal barrier layer has a porosity of 10-30%.

6. The high-temperature resistant component according to claim 1, wherein the environmental barrier layer is formed using a solution containing a silica precursor.

7. A gas turbine hot part using the high-temperature resistant component according to claim 1.

8. The gas turbine hot part according to claim 7, wherein the gas turbine hot part is a bucket.

9. The gas turbine hot part according to claim 7, wherein the gas turbine hot part is used in a corrosive environment with use of low-grade oil.

10. The high-temperature resistant component according to claim 1, wherein the environmental barrier layer consists of silica glass with 90% or more purity of silica.

11. The high-temperature resistant component according to claim 1, wherein the thermal barrier layer comprises partially-stabilized zirconia.

12. The high-temperature resistant component according to claim 1, wherein the bond coat is an alloy layer made of a MCrAlY alloy or MCrAl alloy where M is at least one element selected from the group consisting of Fe, Ni, and Co.

13. A high-temperature resistant component comprising:
a substrate containing an alloy including Ni, Co, or Fe as a principal component;
a bond coat being formed on the substrate and including an alloy; and
a thermal barrier coating being formed on the bond coat, wherein the thermal barrier coating comprises a thermal barrier layer formed on the bond coat and containing porous ceramic, an impregnated layer formed on the thermal barrier layer, and an environmental barrier layer formed on the impregnated layer and consisting of silica glass, the impregnated layer being a layer in which pores of the porous ceramic of the thermal barrier layer are impregnated with a part of the silica of the environmental barrier layer, and the impregnated layer having a thickness of 0.01-0.1 mm.

14. The high-temperature resistant component according to claim 13, wherein the thermal barrier layer contains zirconia.

15. The high-temperature resistant component according to claim 13, wherein the environmental barrier layer has a thickness of 0.05-0.1 mm.

16. The high-temperature resistant component according to claim 13, wherein the environmental barrier layer has a porosity of 5% or less.

17. The high-temperature resistant component according to claim 13, wherein the thermal barrier layer has a thickness of 0.1-1 mm.

18. The high-temperature resistant component according to claim 13, wherein the thermal barrier layer has a porosity of 10-30%.

19. The high-temperature resistant component according to claim 13, wherein the environmental barrier layer is formed using a solution containing a silica precursor.

20. A gas turbine hot part using the high-temperature resistant component according to claim 13.

21. The gas turbine hot part according to claim 20, wherein the gas turbine hot part is a bucket.

22. The gas turbine hot part according to claim 20, wherein the gas turbine hot part is used in a corrosive environment with use of low-grade oil.

\* \* \* \* \*